(12) United States Patent
Ouyang

(10) Patent No.: US 11,517,046 B2
(45) Date of Patent: Dec. 6, 2022

(54) BATTERY ASSEMBLY AND ELECTRONIC CIGARETTE HAVING SAME

(71) Applicant: SHENZHEN IVPS TECHNOLOGY CO., LTD., Shenzhen (CN)

(72) Inventor: Junwei Ouyang, Shenzhen (CN)

(73) Assignee: SHENZHEN IVPS TECHNOLOGY CO., LTD., Shenzhen (CN)

( * ) Notice: Subject to any disclaimer, the term of this patent is extended or adjusted under 35 U.S.C. 154(b) by 1035 days.

(21) Appl. No.: 16/147,615

(22) Filed: Sep. 29, 2018

(65) Prior Publication Data
US 2019/0223499 A1 Jul. 25, 2019

(30) Foreign Application Priority Data
Jan. 19, 2018 (CN) .......................... 201820100620.6

(51) Int. Cl.
| | |
|---|---|
| *A24F 40/40* | (2020.01) |
| *H01M 50/10* | (2021.01) |
| *H01M 50/20* | (2021.01) |
| *H01M 50/502* | (2021.01) |
| *A24F 40/90* | (2020.01) |

(Continued)

(52) U.S. Cl.
CPC .............. *A24F 40/40* (2020.01); *A24F 40/90* (2020.01); *A24F 40/95* (2020.01); *B65D 43/16* (2013.01); *H01M 50/10* (2021.01); *H01M 50/20* (2021.01); *H01M 50/502* (2021.01); *A24F 40/10* (2020.01); *B65D 43/162* (2013.01); *B65D 43/163* (2013.01); *H01M 50/202* (2021.01); *H01M 50/514* (2021.01); *H01M 2220/30* (2013.01); *H01M 2250/405* (2013.01)

(58) Field of Classification Search
CPC .......... A24F 40/40; A24F 40/90; A24F 40/95; A24F 40/10; B65D 43/16; B65D 43/162; B65D 43/163; H01M 50/10; H01M 50/20; H01M 50/502; H01M 50/202; H01M 50/514; H01M 2220/30; H01M 2250/405; Y02E 60/10
See application file for complete search history.

(56) References Cited

U.S. PATENT DOCUMENTS

| | | | | |
|---|---|---|---|---|
| 10,383,367 | B2 * | 8/2019 | Rasmussen | .............. H05B 3/46 |
| 2018/0277806 | A1 * | 9/2018 | Chen | ................... H01M 50/213 |

FOREIGN PATENT DOCUMENTS

| | | | |
|---|---|---|---|
| CN | 102386344 A | * | 3/2012 |
| CN | 206808665 U | | 12/2017 |

(Continued)

*Primary Examiner* — Abdullah A Riyami
*Assistant Examiner* — Justin M Kratt
(74) *Attorney, Agent, or Firm* — IP-PAL Patent US; Klaus Michael Schmid

(57) ABSTRACT

The present disclosure discloses a battery assembly and an electronic cigarette using the battery assembly, wherein the battery assembly comprises a main body and a cover, the main body is provided with a battery compartment with an opening, one end of the cover is rotatably mounted on the main body, and the other end is provided with a locking assembly, the end of the battery compartment close to the opening is provided with a limiting part, the cover is locked to the main body and covers the opening when rotating to the locking assembly to be fastened to the limiting part, the main body is further provided with at least one elastic assembly which elastically abuts against the cover when the cover covers the main body.

9 Claims, 6 Drawing Sheets

(51) Int. Cl.
    *A24F 40/95*     (2020.01)
    *B65D 43/16*     (2006.01)
    *A24F 40/10*     (2020.01)
    *H01M 50/514*     (2021.01)
    *H01M 50/202*     (2021.01)

(56) References Cited

FOREIGN PATENT DOCUMENTS

| | | | | | |
|---|---|---|---|---|---|
| CN | 206909703 U | * | 1/2018 | ........... | A24F 47/008 |
| JP | H08255602 A | * | 10/1996 | | |

* cited by examiner

BATTERY ASSEMBLY AND ELECTRONIC CIGARETTE HAVING SAME

TECHNICAL FIELD

The present disclosure relates to a battery assembly and an electronic cigarette using the battery assembly.

BACKGROUND

Electronic cigarettes, also known as electronic cigarettes, are mainly used to quit smoking and replace conventional cigarettes. It has an appearance and taste similar to conventional cigarettes, and even has more tastes than conventional cigarettes. It can generate smoke, a taste and a feel like conventional cigarettes. Without tar, suspension particles and other harmful components in conventional cigarettes, electronic cigarettes have gradually replaced conventional cigarettes in the market. The existing electronic cigarettes supply power to the heat generating unit in the atomizer through the battery assembly, so that the heat generating unit heats the tobacco liquid to generate smoke under the driving of the battery assembly, thereby enabling the user to obtain a smoking experience.

However, since the existing electronic cigarette has many functions and a large power, it is necessary to disassemble the battery frequently for charging. The battery cover of the conventional battery assembly is often of a pulling type or fastening and separating type. The design has the defect that it is easy to wear the battery and have a battery short circuit. At the same time, the battery cover is easily lost, which is inconvenient for the user. Therefore, the battery cover of the existing electronic cigarette product is usually mounted on the main body in a manner of rotating and fastening. However, there is also a phenomenon that the outer surface of the battery cover collides with and is in hard contact with the housing of the battery assembly since the amount of rotation is too large when the battery cover rotates, resulting in a phenomenon that it is easy for paint to peel off during long-term use.

SUMMARY

The main object of the present disclosure is to provide a battery assembly, which aims to prevent the phenomenon that paint peels off due to collision with the battery assembly when the cover rotates.

In order to achieve the above object, the present disclosure provides a battery assembly comprising a main body and a cover, wherein the main body is provided with a battery compartment with an opening, one end of the cover is rotatably mounted on the main body, and the other end is provided with a locking assembly, the end of the battery compartment close to the opening is provided with a limiting part, the cover is locked to the main body and covers the opening when the cover is rotated to a position where the locking assembly is coupled to the limiting part, the main body is further provided with at least one elastic assembly which elastically abuts against the cover when the cover covers the main body, and the outer periphery of the elastic assembly abuts against a side wall of the cover facing the limiting part when the cover is rotated to expose the opening.

Preferably, the main body is provided with a receiving groove for receiving the cover, the receiving groove comprises a small-diameter section and a large-diameter section provided with the limiting part, one end of the cover is provided with a rotatable part which is rotatably mounted on the small-diameter section, the elastic assembly is provided adjacent to the intersection of the small-diameter section and the large-diameter section, and the outer periphery of the elastic assembly abuts against a side wall of the rotatable part facing the limiting part when the cover is rotated to expose the opening.

Preferably, the elastic assembly comprises a fixed base provided with a receiving hole, an elastic member mounted in the receiving hole, and a limiting head connected with the elastic member, the fixed base is mounted on the main body, the limiting head is partially slidably mounted in the fixed base, the limiting head abuts against the fixed base when sliding to the end of the fixed base, the cover abuts against the limiting head when being coupled with the main body, and a side wall of the rotatable part facing the limiting part abuts against the outer periphery of the limiting head when the cover is rotated to expose the opening.

Preferably, the rotatable part is further provided with an avoidance groove corresponding to the elastic assembly, the limiting head abuts against the avoidance groove, the limiting head slides along the avoidance groove and is ejected from the receiving hole when the rotatable part rotates, and the limiting head is disengaged and completely ejected from the receiving hole and abuts against a side groove wall of the avoidance groove facing the limiting part when the cover is rotated to expose the opening.

Preferably, the battery assembly is further provided with an elastic needle rotating shaft, the rotatable part is provided with a first shaft hole receiving the elastic needle rotating shaft, two side walls of the small-diameter section are provided with two second shaft holes corresponding to the first shaft hole, the elastic needle rotating shaft penetrates through the first shaft hole, and both ends of the elastic needle rotating shaft are exposed from the first shaft hole and are received in the two second shaft holes.

Preferably, the elastic needle rotating shaft comprises an elastic connector, a sleeve received in the first shaft hole, and two end shafts exposed to both ends of the sleeve, the elastic connector is received in the sleeve and is fixedly connected with the two end shafts, and each of the end shafts is partially slidably mounted in the sleeve, and abuts against the sleeve when sliding to the end position of the sleeve.

Preferably, the cover is further provided with a sliding groove and a retaining groove opening, the retaining groove opening is provided away from the opening and enables an outside space to be communicated with the sliding groove, the locking assembly is slidably mounted in the sliding groove and is at least partially received in the retaining groove opening, the locking assembly slides along the sliding groove to abut when being in contact with the end of the retaining groove opening close to the limiting part to form a locking position, and the locking assembly slides along the sliding groove to abut when being in contact with the end of the retaining groove opening far away from the limiting part to form a disengaging position.

Preferably, the locking assembly comprises a locking member, a control member and a spring, one end of the control member is fixedly connected with the locking member, and the other end is received in the retaining groove opening, the locking member is slidably mounted in the sliding groove, the locking member abuts against the limiting part and locks the cover to the main body when the locking member slides until the control member is in the locking position, the locking member is separated from the limiting part and the cover is partially disengaged from the main body when the locking member slides until the control member is in the disengaged position, one end of the spring is fixedly connected with one end of the locking member far away from the limiting part, and the other end is fixedly connected with the inner groove wall of the sliding groove.

Preferably, the thickness value H of the limiting part is gradually reduced from an end at which the limiting part is connected with the main body toward the end at which the limiting part extends, and is integrally provided in a wedge shape, the locking member is adapted to be wedge-shaped corresponding to the limiting part; the definition is as follows: the distance value of the limiting part from a surface facing the opening to a surface far away from the opening is the thickness value H of the limit part.

The present disclosure further provides an electronic cigarette comprising an atomizer and a battery assembly, wherein the battery assembly comprises a main body and a cover, wherein the main body is provided with a battery compartment with an opening, one end of the cover is rotatably mounted on the main body, and the other end is provided with a locking assembly, the end of the battery compartment close to the opening is provided with a limiting part, the cover is locked to the main body and covers the opening when rotating to the locking assembly to be fastened to the limiting part, the main body is further provided with at least one elastic assembly which elastically abuts against the cover when the cover covers the main body, and the outer periphery of the elastic assembly abuts against a side wall of the cover facing the limiting part when the cover is rotated to expose the opening.

For the battery assembly of the technical solution of the present disclosure, the main body is provided with at least one elastic assembly which elastically abuts against the cover when the cover covers the main body, thereby effectively enabling the locking assembly to closely abut against the limiting part to prevent the phenomenon that the cover is shaken and makes a noise during the use of the user. At the same time, the outer periphery of the elastic assembly abuts against a side wall of the cover facing the limiting part when the cover is rotated to expose the opening. It is to be understood that the included angle value between the cover and the plane of the opening gradually increases from 0° to nearly 90° in the process that the cover is opened. The cover is perpendicular to the plane of the opening to expose the opening. At this time, the outer periphery of the elastic assembly abuts against a side wall of the cover facing the limiting part, and the cover is limited to the main body, so that the cover can no longer be turned backwards, which effectively prevents the phenomenon that paint peels off since the cover collides with the battery assembly.

BRIEF DESCRIPTION OF THE DRAWINGS

For a better illustration of the embodiments of the present disclosure or the technical solution in the prior art, accompanying drawings needed in the description of the embodiments or the prior art are simply illustrated below. Obviously, the accompanying drawings described below are some embodiments of the present disclosure. For those skilled in the art, other accompanying drawings may be obtained according to the structure shown in these accompanying drawings without creative work.

DESCRIPTION OF THE REFERENCE NUMBERS

Figure 1:
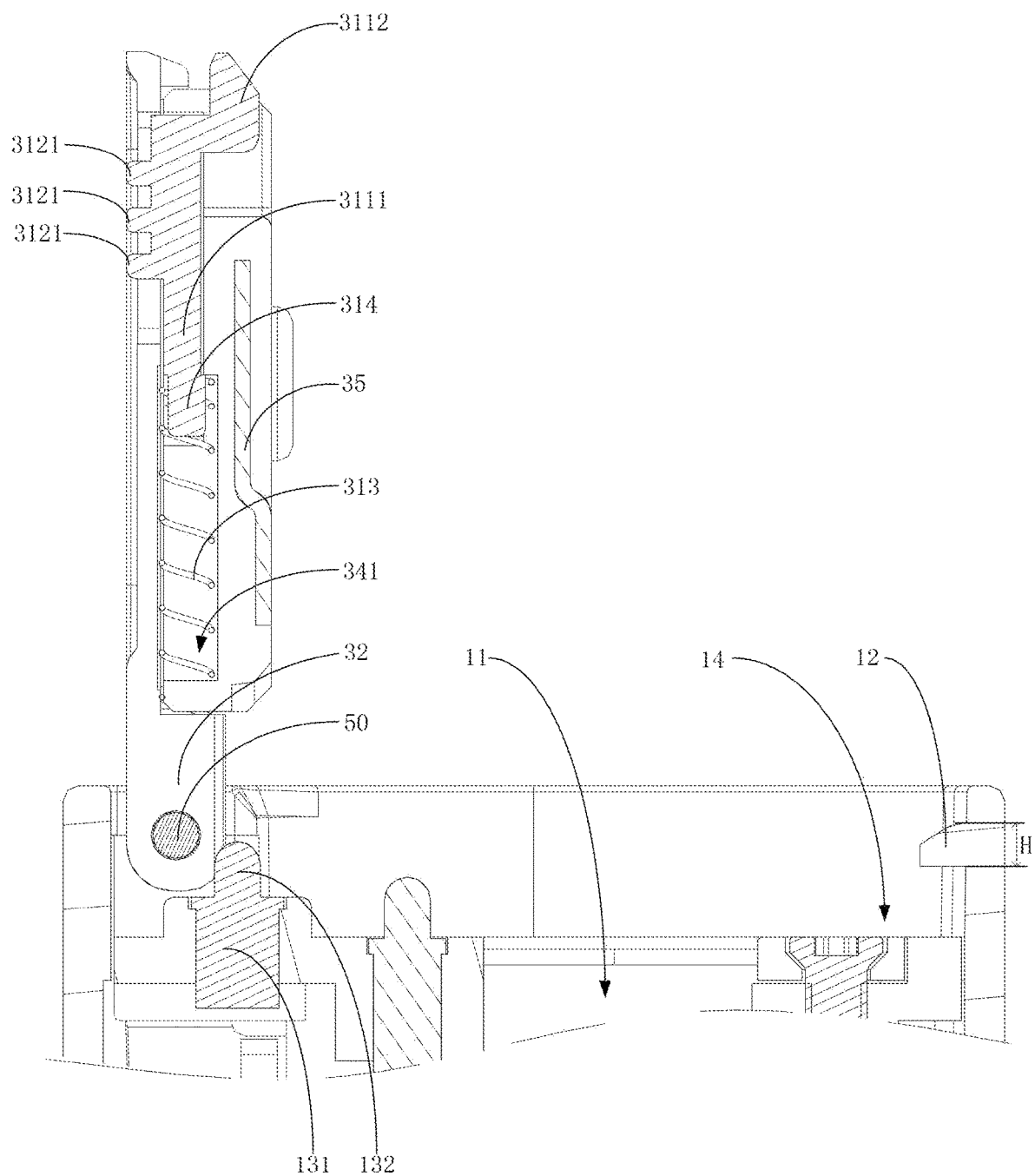
FIG. 1 is a schematic partial cross-sectional diagram illustrating a connecting structure when a cover of the battery assembly according to the present disclosure is opened.

| Reference number | Name of part | Reference number | Name of part |
| --- | --- | --- | --- |
| 100 | battery assembly | 3121 | rib |
| 10 | main body | 313 | spring |
| 11 | battery compartment | 314 | fixed column |
| 12 | limiting part | 32 | rotatable part |
| 13 | elastic assembly | 321 | first shaft hole |
| 131 | fixed base | 322 | avoidance groove |
| 132 | limiting head | 33 | second cover body |
| 14 | receiving groove | 34 | first cover body |
| 141 | small-diameter section | 341 | sliding groove |
| 1411 | second shaft hole | 3411 | wide-diameter section |
| 142 | large-diameter section | 3412 | narrow-diameter section |
| 30 | cover | 342 | retaining groove opening |
| 31 | locking assembly | 343 | retaining groove |
| 311 | locking member | 35 | conductive sheet |
| 3111 | sliding part | 50 | elastic needle rotating shaft |
| 3112 | locking part | 51 | sleeve |
| 312 | control member | 52 | end shaft |

The implementation of aims, the function features and the advantages of the present disclosure are described below in further detail in conjunction with embodiments with reference to the drawings.

DESCRIPTION OF THE EMBODIMENTS

A clear and complete description as below is provided for the technical solution in the embodiments of the present disclosure in conjunction with the drawings in the embodiments of the present disclosure. Obviously, the embodiments described hereinafter are simply part embodiments of the present disclosure, rather than all the embodiments. All other embodiments obtained by those skilled in the art based on the embodiments in the present disclosure without creative work are intended to be comprised in the scope of protection of the present disclosure.

It should be noted that all directional indications (such as top, bottom, left, right, front, behind . . . ) in the embodiments of the present disclosure are merely to illustrate a relative position relation, a relative motion condition, etc. between each part in a certain state (for example, the state shown in the drawings). If the state changes, the directional indication changes accordingly.

In addition, if terms "first", "second", etc. appear in the present disclosure, they are merely for the purpose of description, but cannot be understood as the indication or implication of relative importance or as the implicit indication of the number of the designated technical features; therefore, features defined by "first" and "second" may specifically or implicitly comprise at least one such feature. In addition, technical solutions of each embodiment of the present disclosure may be combined mutually; however, this must be carried out on the basis that those skilled in the art can implement the combination. When the combination of technical solutions has a conflict or cannot be implemented, it should considered that such combination of technical solutions does not exist and is not in the scope of protection claimed by the present disclosure.

In the utility model, unless otherwise specifically stated and defined, terms "connected", "fixed", etc. should be interpreted expansively. For example, "fixed" may be fixed connection, detachable connection, or integration; may be mechanical connection or electrical connection; direct connection, indirect connection through an intermediate, or internal communication between two elements or interaction of two elements, unless otherwise specifically defined. Those skilled in the art can understand the specific implication of the above terms in the present disclosure according to specific conditions.

The present disclosure provides a battery assembly 100, which is applied to an electronic cigarette. The electronic cigarette comprises an atomizer (not shown in the figure). An oil storing chamber and a heat generating assembly are provided in the atomizer. The battery assembly 100 is provided with an atomizer joint which is fixedly electrically connected with the atomizer, and the main control board provided in the battery assembly 100 controls the output current of the power supply to supply power to the heat generating assembly in the atomizer, so that the heat generating assembly heats tobacco tar when driven by the battery assembly 100 to generate smoke, thus giving the user a smoking experience.

Referring to FIG. 1 to FIG. 6, in the embodiment of the present disclosure, the battery assembly 100 comprises a main body 10 and a cover 30. The main body 10 is provided with a battery compartment 11 with an opening. One end of the cover 30 is rotatably mounted on the main body 10, and the other end is provided with a locking assembly 31. The end of the battery compartment 11 close to the opening is provided with a limiting part 12. The cover 30 is locked to the main body 10 and covers the opening when rotating to the locking assembly 31 to be fastened to the limiting part 12. The main body 10 is further provided with at least one elastic assembly 13 which elastically abuts against the cover 30 when the cover 30 covers the main body 10, and the outer periphery of the elastic assembly 13 abuts against a side wall of the cover 30 facing the limiting part 12 when the cover 30 is rotated to expose the opening.

For the battery assembly 100 of the technical solution of the present disclosure, the main body 10 is provided with at least one elastic assembly 13 which elastically abuts against the cover 30 when the cover 30 covers the main body 10, thereby effectively enabling the locking assembly 31 to closely abut against the limiting part 12 to prevent the phenomenon that the cover 30 is shaken and makes a noise during the use of the user. At the same time, the outer periphery of the elastic assembly 13 abuts against a side wall of the cover 30 facing the limiting part 12 when the cover 30 is rotated to expose the opening. It is to be understood that the included angle value between the cover 30 and the plane of the opening gradually increases from 0° to nearly 90°—in the process that the cover 30 is opened. The cover 30 is perpendicular to the plane of the opening to expose the opening. At this time, the outer periphery of the elastic assembly 13 abuts against a side wall of the cover 30 facing the limiting part 12, and the cover 30 is limited to the main body 10, so that the cover 30 can no longer be turned backwards, which effectively prevents the phenomenon that paint peels off since the cover 30 collides with the battery assembly 100.

Figure 3:
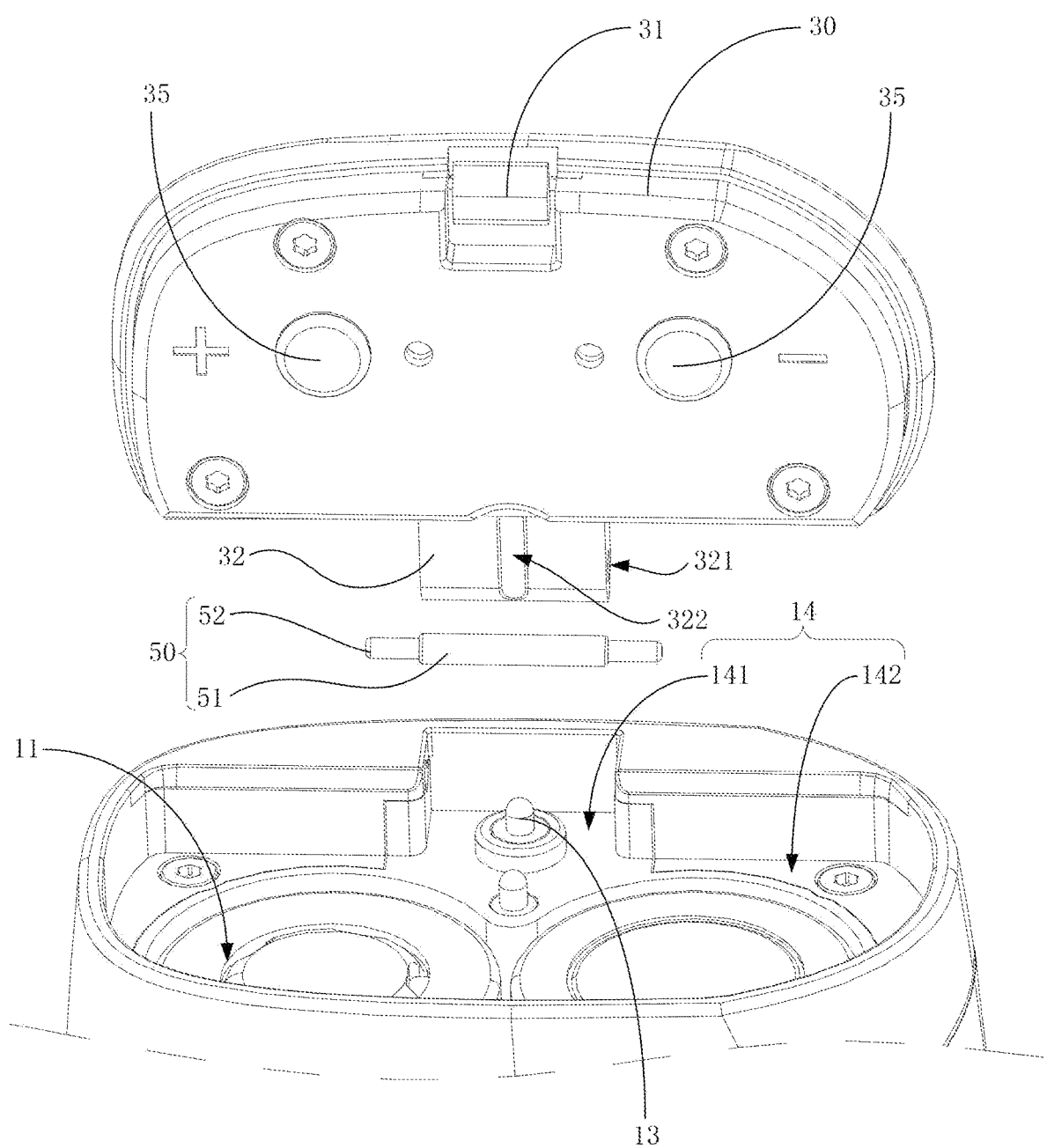
FIG. 3 is a schematic partial cross-sectional diagram illustrating a connecting structure of the battery assembly according to the present disclosure.

Specifically, as shown in FIG. 3, in the embodiment of the present disclosure, the main body 10 is provided with a receiving groove 14 for receiving the cover 30. The receiving groove 14 comprises a small-diameter section 141 and a large-diameter section 142 provided with the limiting part 12. One end of the cover 30 is provided with a rotatable part 32 which is rotatably mounted on the small-diameter section 141. The elastic assembly 13 is provided adjacent to the intersection of the small-diameter section 141 and the large-diameter section 142, and the outer periphery of the elastic assembly 13 abuts against a side wall of the rotatable part 32 facing the limiting part 12 when the cover 30 is rotated to expose the opening. Here, the receiving groove 14 is communicated with the battery compartment 11 to form a step, which is convenient for mounting other components. At the same time, the receiving groove 14 comprises a small-diameter section 141 and a large-diameter section 142 provided with the limiting part 12. The rotatable part 32 is rotatably mounted on the small-diameter section 141 so that the rotatable part 32 is entirely limited to the small-diameter section 141. The structure is compact, and the phenomenon that the rotating shaft peels off and looses during long-term use so that the cover 30 is disengaged from the main body 10 is effectively prevented.

It is to be understood that, in actual application, the user can set the mounting position of the elastic assembly 13 according to the actual size of the rotatable part 32 and the mounting position of the small-diameter section 141, so that the outer periphery of the elastic assembly 13 abuts against a side wall of the cover facing the limiting part 12 when the cover is rotated to expose the opening.

Figure 2:
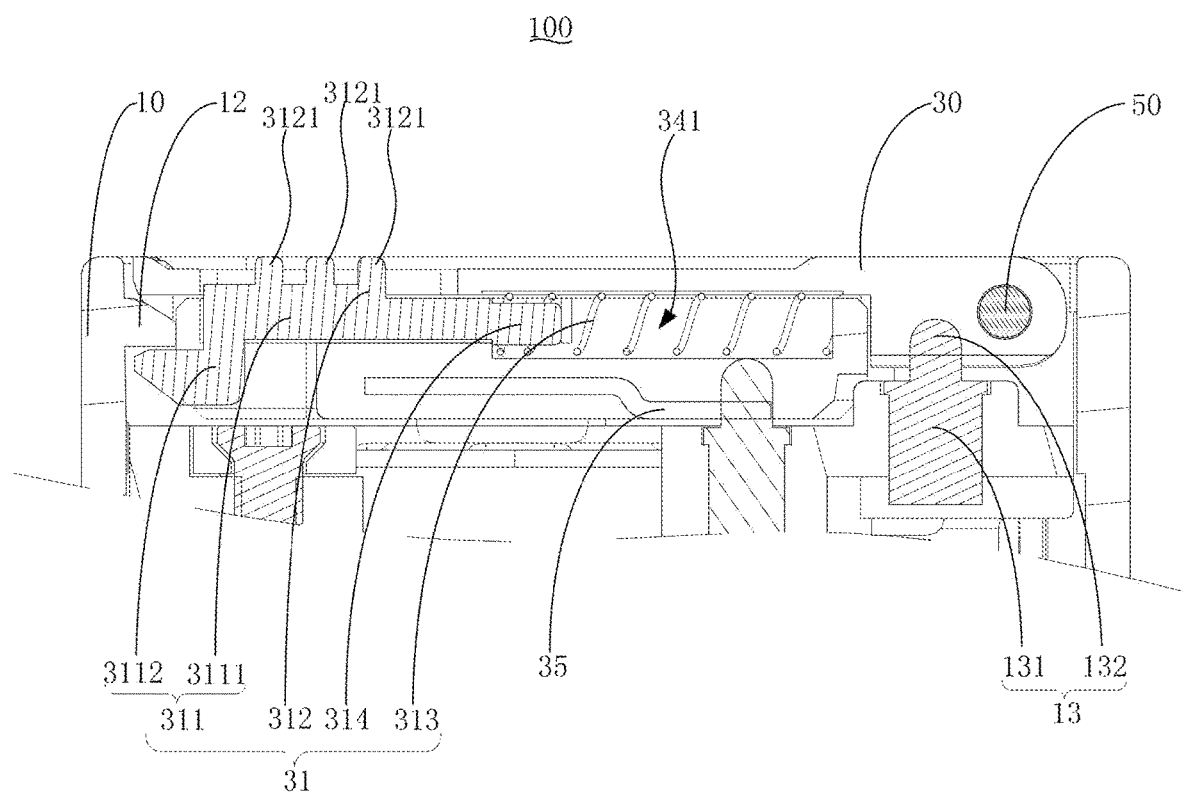
FIG. 2 is a schematic partial cross-sectional diagram illustrating a connecting structure when a cover of the battery assembly according to the present disclosure is fastened.

Specifically, as shown in FIG. 1 or FIG. 2, in the embodiment of the present disclosure, the elastic assembly 13 comprises a fixed base 131 provided with a receiving hole, an elastic member (not shown) mounted in the receiving hole, and a limiting head 132 connected with the elastic member. The fixed base 131 is mounted on the main body 10. The limiting head 132 is partially slidably mounted in the fixed base 131. The limiting head 132 abuts against the fixed base 131 when sliding to the end of the fixed base 131. The cover 30 abuts against the limiting head 132 when the cover 30 is coupled to the main body 10, and a side wall of the rotatable part 32 facing the limiting part 12 abuts against the outer periphery of the limiting head 132 when the cover 30 is rotated to expose the opening. Here, the elastic assembly is made of an elastic material such as a spring or an elastic plastic. In the embodiment, the elastic assembly is made of a spring, and the fixed base 131 and the limiting head 132 are made of a hard material. One end of the fixed base 131 far away from the limiting head 132 is partially embedded in the main body 10. The spring 313 is mounted in the receiving hole, and then the limiting head 132 is slidably mounted in the receiving hole and elastically abuts against the spring 313, so that the limiting head 132 is slidable along the receiving hole. At the same time, the end of the limiting head 132 in contact with the elastic assembly is provided with a flange to prevent the phenomenon that the limiting head 132 is disengaged from the fixed base 131. When the cover 30 covers the main body 10, the limiting head 132 squeezes the spring 313 toward the fixed base 131. When the user opens the cover 30, the limiting head 132 ejects the cover 30 under the elastic restoring force of the spring 313, which is convenient for the user to open the cover 30. At the same time, when the cover 30 is further rotated to the fully exposed opening, the rotatable part 32 abuts against the outer periphery of the limiting head 132 of a hard material toward the side wall of the limiting part 12. At the same time, the fixed base 131 is made of a hard material, which effectively limits the deformation of the limiting head 132. Therefore, the limiting head 132 abuts against the rotatable part 32 for limiting so as to prevent the phenomenon that the cover 30 is further rotated so that paint peels off since the cover 30 collides with the main body 10.

Figure 4:
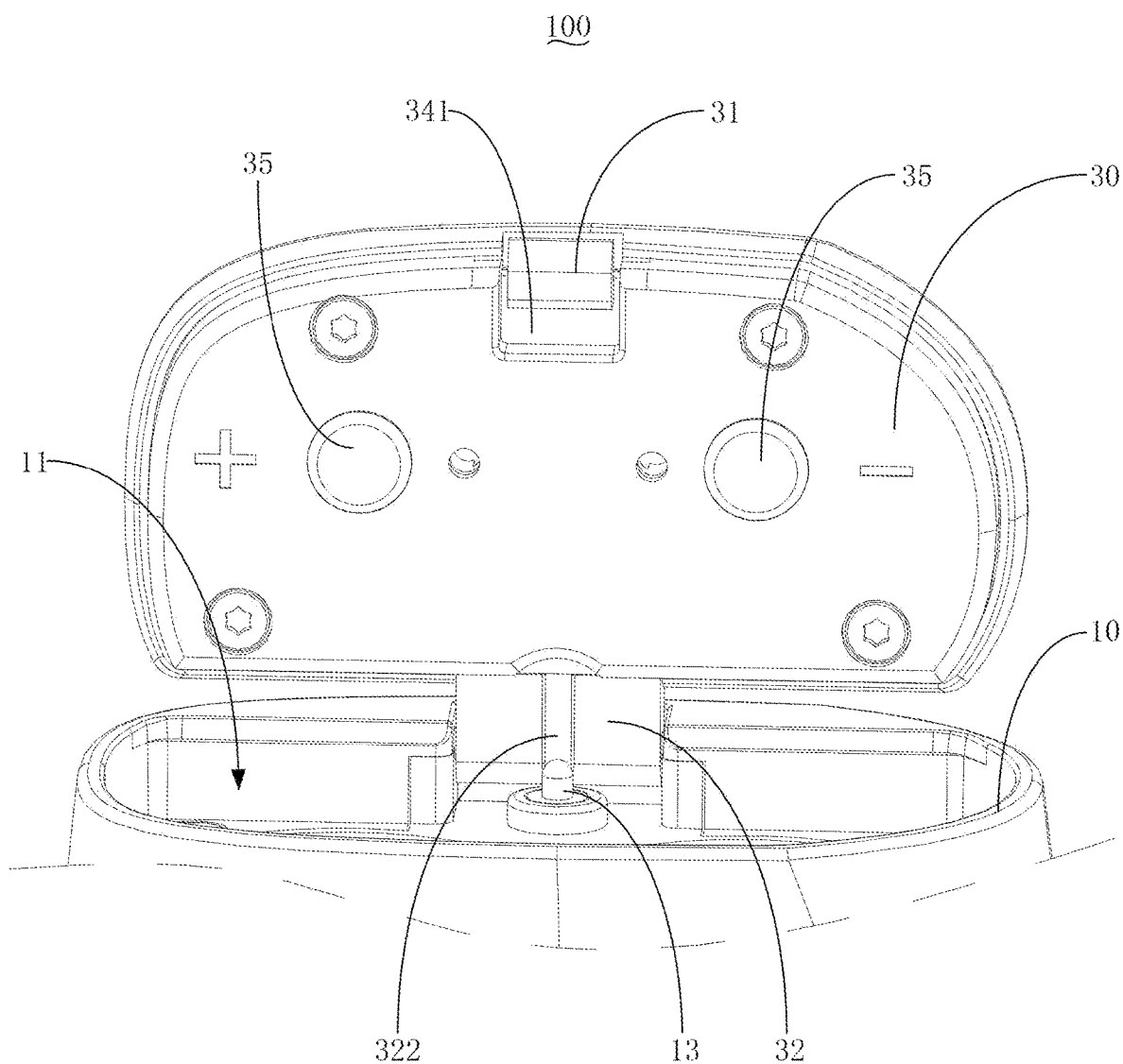
FIG. 4 is a schematic front diagram illustrating a connecting structure of the battery assembly according to the present disclosure.

Further, as shown in FIG. 3 or FIG. 4, in the embodiment of the present disclosure, the rotatable part 32 is further provided with an avoidance groove 322 corresponding to the elastic assembly 13, the limiting head 132 abuts against the avoidance groove 322, the limiting head 132 slides along the avoidance groove 322 and is ejected from the receiving hole when the rotatable part 32 rotates, and the limiting head 132 is disengaged and completely ejected from the receiving hole and abuts against a side groove wall of the avoidance groove 322 facing the limiting part 12 when the cover 30 is rotated to expose the opening. Here, the rotatable part 32 is provided with an avoidance groove 322 corresponding to the elastic assembly 13, so that the movement is mellow and smooth when the rotatable part 32 and the elastic assembly 13 rotate.

Further, the battery assembly 100 is further provided with an elastic needle rotating shaft 50, the rotatable part 32 is provided with a first shaft hole 321 receiving the elastic needle rotating shaft 50, two side walls of the small-diameter section 141 are provided with two second shaft holes 1411 corresponding to the first shaft hole 321, the elastic needle rotating shaft 50 penetrates through the first shaft hole 321, and both ends of the elastic needle rotating shaft 50 are exposed from the first shaft hole 321 and are received in the two second shaft holes 1411. Here, in the embodiment, in a manner of the elastic needle rotating shaft 50, the user first inserts the elastic needle rotating shaft 50 into the first shaft hole 321 during mounting, and both ends of the elastic needle rotating shaft 50 are exposed from the first shaft hole 321. After both ends of the elastic needle rotating shaft 50 are squeezed to deform, the limiting part 12 is mounted to the small-diameter section 141, and both ends of the elastic needle rotating shaft 50 are inserted into two second shaft hole 1411, respectively, so as to complete mounting. In the embodiment, it is convenient for the user to mount and disassemble with respect to the rigid clamping.

It is to be understood that, in the actual application process, the embodiment is not limited to the mounting manner in which the first shaft hole 321 is provided in the rotatable part 32, and two second shaft holes 1411 are provided in the small-diameter section 141. For example, two mounting holes may also be provided corresponding to two opposite side walls of the small-diameter section 141. The mounting manner in which a rotating hole through which the elastic needle partly passes is provided in each of the mounting holes and the rotatable part 32 is provided with two positioning holes through which the elastic needle partly passes to realize rotation falls within the scope of protection of the present disclosure.

Specifically, as shown in FIG. 3, in the embodiment of the present disclosure, the elastic needle rotating shaft 50 comprises an elastic connector (not shown), a sleeve 51 received in the first shaft hole 321, and two end shafts 52 exposed to both ends of the sleeve 51, the elastic connector is received in the sleeve 51 and is fixedly connected with the two end shafts 52, and each of the end shafts 52 is partially slidably mounted in the sleeve 51, and abuts against the sleeve 51 when sliding to the end position of the sleeve 51. Here, in the embodiment, the elastic connector is made of a spring. The elastic connector is mounted in the spring, and both ends of the spring 15 are fixedly connected with two end shafts 52, respectively, so that two end shafts 52 is slidable toward the inside of the sleeve 51 under the external force, which is convenient for the user to mount.

Figure 5:
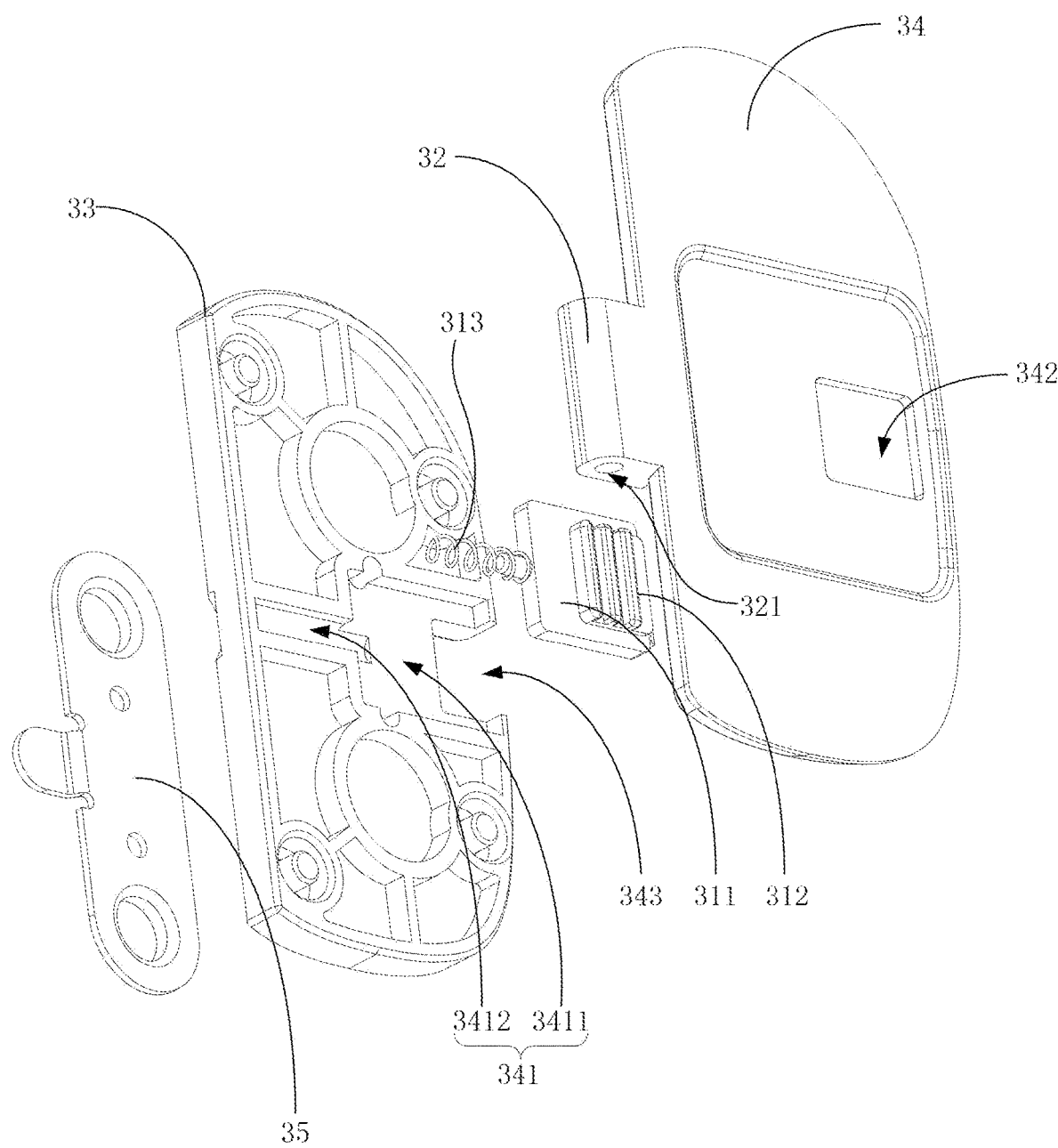
FIG. 5 is a schematic exploded diagram illustrating a connecting structure of a cover according to the present disclosure.

Further, as shown in FIG. 5, in the embodiment of the present disclosure, the cover 30 is further provided with a sliding groove 341 and a retaining groove opening 342, the retaining groove opening 342 is provided away from the opening and enables outside space to be communicated with the sliding groove 341, the locking assembly 31 is slidably mounted in the sliding groove 341 and is at least partially received in the retaining groove opening 342, the locking assembly 31 slides along the sliding groove 341 to abut when being in contact with the end of the retaining groove opening 342 close to the limiting part 12 to form a locking position, and the locking assembly 31 slides along the sliding groove 341 to abut when being in contact with the end of the opening 342 of the retaining groove 343 far away from the limiting part 12 to form a disengaging position. Here, in the embodiment, the end of the cover 30 far away from the opening is provided with an opening 342 of the retaining groove 343, and the locking assembly 31 is at least partially received in the opening 342 of the retaining groove 343, so that the user controls the sliding of the locking assembly 31. At the same time, the locking assembly 31 abuts against the inner groove wall of the opening 342 of the retaining groove 343 during the sliding process, thereby forming the locking position and the disengaging position, limiting the sliding stroke of the locking assembly 31, and facilitating the user to know the locking situation of the locking assembly 31 and the limiting part 12 when operating.

Specifically, as shown in FIG. 5, in the embodiment of the present disclosure, the locking assembly 31 comprises a locking member 311, a control member 312 and a spring 313, one end of the control member 312 is fixedly connected with the locking member 311, and the other end is received in the opening 342 of the retaining groove 343, the locking member 311 is slidably mounted in the sliding groove 341, the locking member 311 abuts against the limiting part 12 and locks the cover 30 to the main body 10 when the locking member 311 slides until the control member 312 is in the locking position, the locking member 311 is separated from the limiting part 12 and the cover 30 is partially disengaged from the main body 10 when the locking member 311 slides until the control member 312 is in the disengaged position, one end of the spring 313 is fixedly connected with one end of the locking member 311 far away from the limiting part 12, and the other end is fixedly connected with the inner groove wall of the sliding groove 341. Here, in the embodiment, the control member 312 is fixedly mounted on the locking assembly 311 and is received in the opening 342 of the retaining groove 343, so that the user can perform the manipulation. At the same time, one end of the locking member 311 far away from the limiting part 12 elastically abuts against the inner groove wall of the sliding groove 341 through the spring 313. When the control member 312 is not subjected to the external driving force, the locking assembly 311 closely abuts against the limiting part 12 under the elastic force of the spring 313, the cover 30 is fastened to the main body 10, and the battery compartment 11 is sealed. The connecting strength is high, and looseness between the cover 30 and the main body 10 can be prevented. When the user applies a driving force to the control member 312, the locking assembly 311 compresses the spring 313 and slides along the sliding groove 341 far away from the limiting part 12 to be disengaged from the limiting part 12, so that the cover 30 can be rotated and opened to expose the battery compartment 11, thereby facilitating battery replacement.

Figure 6:
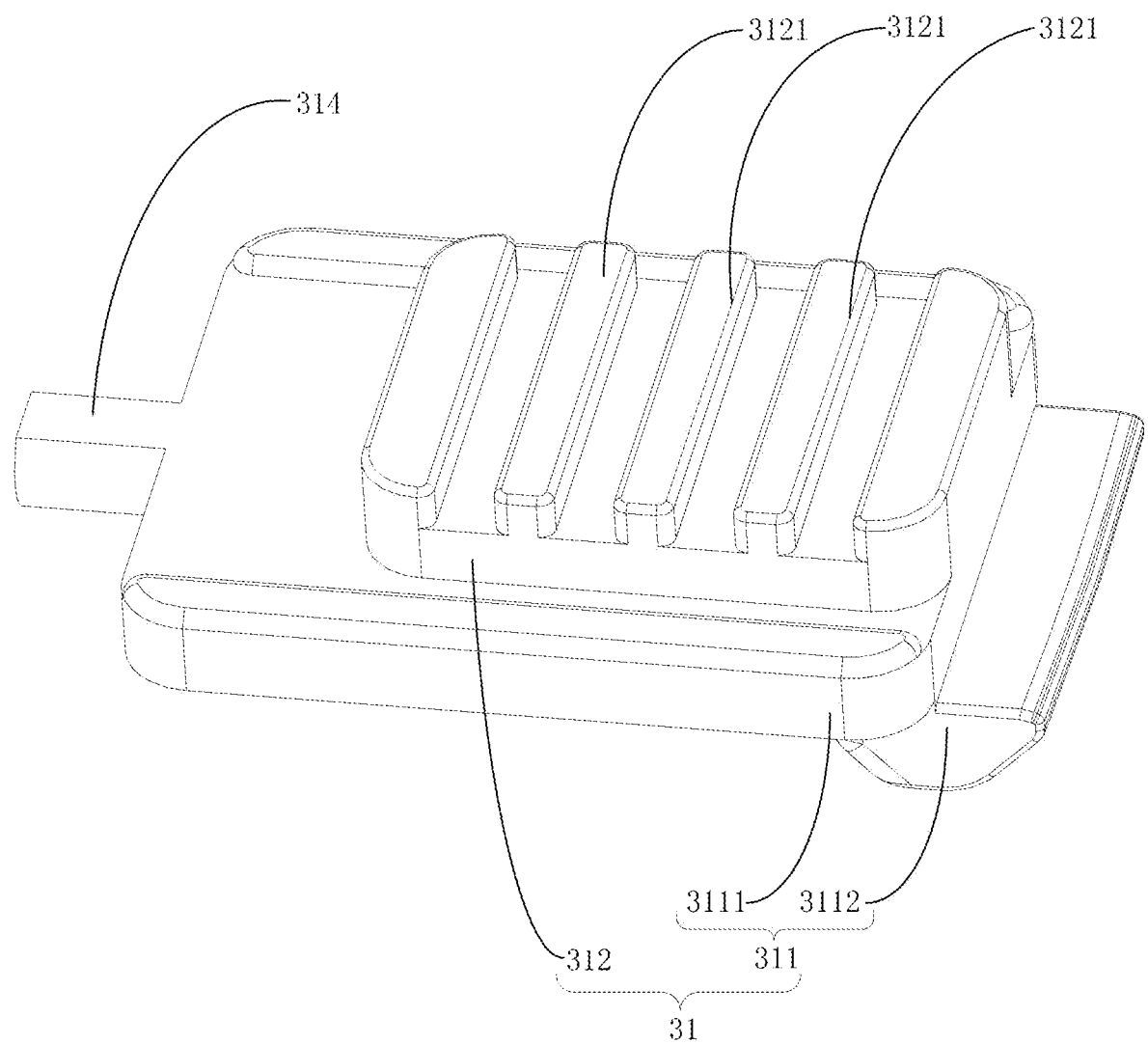
FIG. 6 is a schematic perspective diagram illustrating a connecting structure of a locking member according to the present disclosure.

Specifically, as shown in FIG. 3 or FIG. 6, in the embodiment of the present disclosure, the locking assembly 311 comprises a sliding part 3111 and a locking part 3112. The sliding part 3111 is slidably mounted in the sliding groove 341, and one end of the sliding part 3111 close to the limiting part 12 is fixedly connected with the locking part 3112, and one end thereof far away from the limiting part 12 is fixedly connected with the spring 313. When the sliding part 3111 slides until the control member 312 is in the locking position, the locking part 3112 abuts against the limiting part 12, and the cover 30 is locked to the main body 10. When the sliding part 3111 slides until the control member 312 is in the disengaged position, the locking part 3112 is separated from the limiting part 12, and the cover 30 is partially disengaged from the main body 10. Here, in the embodiment, the locking assembly 311 comprises a sliding part 3111 and a locking part 3112. One end of the sliding part 3111 close to the limiting part 12 is fixedly connected with the locking part 3112, and one end thereof far away from the limiting part 12 is fixedly connected with the spring 313 so that when the cover 30 is fastened the main body 10, the locking part 3112 is moved in the direction of the sliding groove 341 toward the limiting part 12 under the elastic force of the spring 313, and abuts against the limiting part 12, thereby further ensuring the stability of locking.

It is to be understood that, in the actual application process, the limiting part 12 can take the form of a limiting bump or a limiting groove. The manner in which when the cover 30 is fastened to the main body 10, the locking part 3112 abuts against the end of the limiting bump far away from the cover 30 or is inserted into the limiting groove and the cover 30 is locked to the main body 10 falls within the scope of protection of the present disclosure.

Specifically, as shown in FIG. 1, the thickness value H of the limiting part 12 is gradually reduced from an end at which the limiting part is connected with the main body 10 toward the end at which the limiting part extends, and is integrally provided in a wedge shape, the locking member 311 is adapted to be wedge-shaped corresponding to the limiting part 12; the definition is as follows: the distance value of the limiting part 12 from a surface facing the opening to a surface far away from the opening is the thickness value H of the limit part 12. Here, in the embodiment, the limiting part 12 and the locking part 3112 are generally wedge-shaped. When the user fastens the cover 30 to the main body 10, the part of the wedge-shaped locking part 3112 in contact with the limiting part 12 or the main body 10 is an inclined surface, so that the limiting part 12 slides into the sliding groove 341 in the direction of the sliding groove 341 far away from the limiting part 12 under the action of the extruding force. When the cover 30 is fastened to the main body 10, the extruding force disappears, and the locking part 3112 moves toward the limiting part 12 under the force of the spring 313, thereby abutting against and locking to the locking part 12. The connecting strength is high, and the phenomenon that the locking part 3112 is in contact with and abuts against the limiting part 12 toward the surface of the opening so as to be clamped is prevented.

Further, as shown in FIG. 6, the sliding part 3111 is further provided with a positioning column, and the spring 313 is partially sleeved on the outer periphery of the positioning column; here, a positioning column is provided, and the spring 313 is sleeved on the limiting column, the phenomenon that the spring 313 is disengaged from the sliding part 3111 or is moved in other directions during the movement is prevented, effectively improving the smoothness of operation.

Specifically, as shown in FIG. 5, the sliding groove 341 comprises a wide-diameter section 3411 and a narrow-diameter section 3412 communicated with the wide-diameter section 3411. The wide-diameter section 3411 is configured to receive the sliding part 3111, and the narrow-diameter section 3412 is configured to receive the spring 313. Here, in the embodiment, the sliding groove 341 comprises a wide-diameter section 3411 and a narrow-diameter section 3412 configured to receive the sliding part 3111 and the spring 313, respectively. The phenomenon that the use of a spring 313 of a larger size model results in a larger elastic force so that it is inconvenient for the user to manipulate or the phenomenon that the use of a spring 313 of a smaller size model results in the fact the spring 313 is shaken during use so as to have a low service life is prevented, further improving the smoothness of sliding and improving the user experience.

Further, as shown in FIG. 6, one end of the control member 312 far away from the locking assembly 311 is arranged with a plurality of ribs 3121 at intervals. Here, in the embodiment, a plurality of ribs 3121 are arranged in the control member 312 at intervals, effectively improving the friction between the hand of the user and the control part, and facilitating the user to manipulate.

It is to be understood that, in the actual application process, the present disclosure is not limited to the above form in which the control member 312 is provided with a plurality of ribs 3121 arranged at intervals. For example, the manner in which one end of the control member 312 far away from the locking assembly 311 is arranged with flanges of irregular lines so as to achieve the improved friction falls within the scope of protection of the present disclosure.

Specifically, as shown in FIG. 5, the cover 30 comprises a first cover body 34 and a second cover body 33. The first cover body 34 is rotatably mounted on the main body 10. The first cover body 34 is provided with an opening 342 of the retaining groove 343. The second cover body 33 is provided with a retaining groove 343 in which a part of the locking assembly 31 reciprocates. The second cover body 33 is fixedly mounted to one end of the first cover body 34 toward the opening, and surrounds a sliding groove 341 with the first cover body 34. Here, the cover 30 of the embodiment comprises a first cover body 34 and a second cover body 33 for facilitating processing. Then a mounting hole is provided in the second cover body 33, which is fixedly connected with the first cover body 34 through a screw-type fastener. A sliding groove 341 is surrounded between the second cover body 33 and the first cover body 34. At the same time, in the embodiment, the second cover 33 is provided with a retaining groove 343 in which the locking part 3112 reciprocates, so that the size of the locking part 3112 may protrude from the surface of the sliding part 3111 toward the second cover 33. Therefore, the thickness of the cover 30 is reduced, and the structure is more compact.

Specifically, as shown in FIG. 5, the cover 30 comprises a first cover body 34 and a second cover body 33. The first cover body 34 is rotatably mounted on the main body 10. The first cover body 34 is provided with an opening 342 of the retaining groove 343. The second cover body 33 is provided with a retaining groove 343 in which a part of the locking assembly 31 reciprocates. The second cover body 33 is fixedly mounted to one end of the first cover body 34 toward the opening, and surrounds a sliding groove 341 with the first cover body 34. Here, the cover 30 of the embodiment comprises a first cover body 34 and a second cover body 33 for facilitating processing. Then a mounting hole is provided in the second cover body 33, which is fixedly connected with the first cover body 34 through a screw-type fastener. A sliding groove 341 is surrounded between the second cover body 33 and the first cover body 34. At the same time, in the embodiment, the second cover 33 is provided with a retaining groove 343 in which the locking part 3112 reciprocates, so that the size of the locking part 3112 may protrude from the surface of the sliding part 3111 toward the second cover 33. Therefore, the thickness of the cover 30 is reduced, and the structure is more compact.

Specifically, as shown in FIG. 5, the second cover 33 is further provided with a conductive sheet 35 toward the battery compartment 11, and the batteries in the battery compartment 11 are directly formed into an electrical circuit.

The present disclosure further provides an electronic cigarette, wherein the electronic cigarette comprises an atomizer and a battery assembly 100. Refer to the above embodiment for the specific structure of the battery assembly 100. Due to the use of all the technical solutions of all the above embodiments, the electronic cigarette has at least all the beneficial effects brought by the technical solutions of the above embodiments, which will not be described in detail herein. The battery assembly 100 is provided with a connector connected with the atomizer, and the atomizer is electrically connected with the battery assembly 100 when the atomizer is mounted on the connector.

The above are preferred embodiments of the present disclosure merely and are not intended to limit the patent scope of the present disclosure. Any equivalent structures made according to the description and the accompanying drawings of the present disclosure without departing from the idea of the present disclosure, or any equivalent structures applied in other relevant technical fields directly or indirectly are intended to be comprised in the patent protection scope of the present disclosure.

What is claimed is:

1. A battery assembly comprising a main body and a cover, wherein the main body is provided with a battery compartment with an opening, one end of the cover is rotatably mounted on the main body, and the other end is provided with a locking assembly, an end of the battery compartment close to the opening is provided with a limiting part, the cover is locked to the main body and covers the opening when the cover is rotated to a position where the locking assembly is coupled to the limiting part, the main body is further provided with at least one elastic assembly, the at least one elastic assembly elastically abuts against the cover when the cover covers the main body, and an outer periphery of the elastic assembly abuts against a side wall of the cover facing the limiting part when the cover is rotated to expose the opening;

wherein one end of the cover is provided with a rotatable part;
the elastic assembly comprises a limiting head;
wherein the rotatable part is further provided with an avoidance groove corresponding to the elastic assembly, the limiting head abuts against the avoidance groove, the limiting head slides along the avoidance groove and is ejected from the receiving hole when the rotatable part rotates, and the limiting head is disengaged and completely ejected from the receiving hole, and abuts against a side groove wall of the avoidance groove facing the limiting part when the cover is rotated to expose the opening.

2. The battery assembly according to claim 1, wherein the main body is provided with a receiving groove for receiving the cover, the receiving groove comprises a small-diameter section and a large-diameter section, the large-diameter section is provided with the limiting part, the rotatable part is rotatably mounted on the small-diameter section, the elastic assembly is provided adjacent to an intersection of the small-diameter section and the large-diameter section, and the outer periphery of the elastic assembly abuts against a side wall of the rotatable part facing the limiting part when the cover is rotated to expose the opening.

3. The battery assembly according to claim 2, wherein the elastic assembly further comprises a fixed base provided with a receiving hole, and an elastic member mounted in the receiving hole, and the limiting head is connected with the elastic member, the fixed base is mounted on the main body, the limiting head is partially slidably mounted in the fixed base, the limiting head abuts against the fixed base when sliding to the end of the fixed base, the cover abuts against the limiting head when the cover is coupled with the main body, and the side wall of the rotatable part facing the limiting part abuts against the outer periphery of the limiting head when the cover is rotated to expose the opening.

4. The battery assembly according to claim 2, wherein the battery assembly is further provided with an elastic needle rotating shaft, the rotatable part is provided with a first shaft hole receiving the elastic needle rotating shaft, two side walls of the small-diameter section are provided with two second shaft holes corresponding to the first shaft hole, the elastic needle rotating shaft penetrates through the first shaft hole, and both ends of the elastic needle rotating shaft are exposed from the first shaft hole and are received in the two second shaft holes.

5. The battery assembly according to claim 4, wherein the elastic needle rotating shaft comprises an elastic connector, a sleeve received in the first shaft hole, and two end shafts exposed to both ends of the sleeve, the elastic connector is received in the sleeve and is fixedly connected with the two end shafts, and each of the end shafts is partially slidably mounted in the sleeve, and abuts against the sleeve when sliding to an end position of the sleeve.

6. The battery assembly according to claim 1, wherein the cover is further provided with a sliding groove and a retaining groove opening, the retaining groove opening is provided away from the opening and enables an outside space to be communicated with the sliding groove, the locking assembly is slidably mounted in the sliding groove and is at least partially received in the retaining groove opening, the locking assembly slides along the sliding groove to abut the end of the retaining groove opening close to the limiting part when being in contact with the end of the retaining groove opening close to the limiting part to form a locking position, and the locking assembly slides along the sliding groove to abut the end of the retaining groove opening far away from the limiting part when being in contact with the end of the retaining groove opening far away from the limiting part to form a disengaging position.

7. The battery assembly according to claim 6, wherein the locking assembly comprises a locking member, a control member and a spring, one end of the control member is fixedly connected with the locking member, and the other end is received in the retaining groove opening, the locking member is slidably mounted in the sliding groove, the locking member abuts against the limiting part and locks the cover to the main body when the locking member slides until the control member is in the locking position, the locking member is separated from the limiting part and the cover is partially disengaged from the main body when the locking member slides until the control member is in the disengaged position, one end of the spring is fixedly connected with one end of the locking member far away from the limiting part, and the other end is fixedly connected with the inner groove wall of the sliding groove.

8. The battery assembly according to claim 7, wherein the thickness value H of the limiting part is gradually reduced from an end at which the limiting part is connected with the main body toward the end at which the limiting part extends, and is integrally provided in a wedge shape, the locking member is adapted to be wedge-shaped corresponding to the limiting part; the definition is as follows: the distance value of the limiting part from a surface facing the opening to a surface far away from the opening is the thickness value H of the limiting part.

9. An electronic cigarette comprising an atomizer, wherein the electronic cigarette further comprises the battery assembly according to claim 1.

* * * * *